US009663981B2

(12) United States Patent
Conner et al.

(10) Patent No.: US 9,663,981 B2
(45) Date of Patent: May 30, 2017

(54) VEHICLE CLOSURE MEMBER POWER ACTUATOR CONTROL

(71) Applicant: Ford Global Technologies, LLC, Dearborn, MI (US)

(72) Inventors: Gregory Alan Conner, Ann Arbor, MI (US); Jason C. Zasa, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 37 days.

(21) Appl. No.: 14/631,934

(22) Filed: Feb. 26, 2015

(65) Prior Publication Data

US 2015/0284983 A1 Oct. 8, 2015

Related U.S. Application Data

(60) Provisional application No. 61/974,104, filed on Apr. 2, 2014.

(51) Int. Cl.

| | |
|---|---|
| ***H02P 1/04*** | (2006.01) |
| ***E05F 15/60*** | (2015.01) |
| ***E05F 1/10*** | (2006.01) |
| ***E05F 15/41*** | (2015.01) |

(52) U.S. Cl.

CPC ................ *E05F 15/60* (2015.01); *E05F 1/10* (2013.01); *E05F 1/1033* (2013.01); *E05F 1/1091* (2013.01); *E05F 15/41* (2015.01); *E05Y 2400/31* (2013.01); *E05Y 2400/502* (2013.01); *E05Y 2900/546* (2013.01); *E05Y 2900/548* (2013.01)

(58) Field of Classification Search

CPC ...... B60J 5/047; B60J 1/17; B60J 5/10; E05F 15/60; H02H 7/0851

USPC ....... 318/400.4, 266, 455, 466, 434; 49/348, 49/349, 501, 502

See application file for complete search history.

(56) References Cited

U.S. PATENT DOCUMENTS

| | | | |
|---|---|---|---|
| 4,823,059 A | 4/1989 | Compeau et al. | |
| 5,069,000 A | 12/1991 | Zuckerman | |
| 5,448,856 A | 9/1995 | Moore et al. | |
| 5,867,357 A * | 2/1999 | Michel ................ | H02H 7/0851 318/455 |

(Continued)

FOREIGN PATENT DOCUMENTS

| | | |
|---|---|---|
| JP | 2004270307 A | 9/2004 |

*Primary Examiner* — Bentsu Ro
*Assistant Examiner* — Thai Dinh
(74) *Attorney, Agent, or Firm* — Jason Rogers; Brooks Kushman P.C.

(57) ABSTRACT

A system and method are disclosed for controlling the opening and closing of a closure panel for a vehicle. The system includes a power actuator having a motor for opening and closing the closure panel. A lift-assist member cooperates with the power actuator and is operated by a controller that controls the operation of the power actuator. A circuit monitors current draw of the motor and signals the controller when the current required for opening the closure panel exceeds a predetermined level to prevent operation of the power actuator. The position of the closure member may be monitored by an encoder, or angle sensor, associated with the motor to detect whether the closure member is falling and actuate a system that prevents rapid movement of the closure member.

6 Claims, 3 Drawing Sheets

(56) References Cited

U.S. PATENT DOCUMENTS

| | | | | |
|---|---|---|---|---|
| 5,945,796 A * | 8/1999 | Ohmori | H02H 7/0851 | 318/266 |
| 6,061,963 A * | 5/2000 | Osborn | E05F 11/481 | 49/352 |
| 6,064,165 A * | 5/2000 | Boisvert | B60J 7/0573 | 318/465 |
| 6,769,729 B1 | 8/2004 | Bruford et al. | | |
| 7,034,486 B1 * | 4/2006 | McMahon | E05F 15/41 | 318/283 |
| 7,547,058 B2 | 6/2009 | King et al. | | |
| 7,576,504 B2 * | 8/2009 | Mullet | E05F 15/668 | 318/445 |
| 7,637,057 B2 * | 12/2009 | Matsui | E05F 15/611 | 296/56 |
| 7,808,197 B2 * | 10/2010 | Kimura | B60J 5/10 | 296/146.4 |
| 9,056,749 B2 * | 6/2015 | Utsunomiya | B66B 13/143 | |

* cited by examiner

VEHICLE CLOSURE MEMBER POWER ACTUATOR CONTROL

CROSS-REFERENCE TO RELATED APPLICATIONS

This application claims the benefit of U.S. provisional application Ser. No. 61/974,104 filed Apr. 2, 2014, the disclosure of which is hereby incorporated in its entirety by reference herein.

TECHNICAL FIELD

This disclosure relates to a control system for a power actuated vehicle closure member that controls vertical movement of the closure based, in part, upon the level of current required to operate a motor used to operate the vehicle closure member.

BACKGROUND

Vehicles are provided with closure members that are opened by lifting to provide access to the vehicle interior, such as lift gates, tailgates, deck lids, and the like. Power actuators are used to move such closure members at the push of a button on the dashboard, on a key fob, or by movement in front of a sensor. Power actuators generally include an electric motor and a gearing set that have sufficient torque to raise and lower the closure member. Alternatively, the power actuators may be hydraulic or pneumatic cylinders that have motor driven fluid pumps.

Torsion bars, air spring cylinders, tension springs, counterbalance struts, or other lift-assist mechanisms are used to reduce the load on the power actuator that is used to raise and lower the closure member. As power actuators are generally tuned off after opening to conserve battery power, while the lift-assist holds the closure open. Lift-assist mechanisms may be damaged, disconnected, or otherwise become ineffective for a wide variety of reasons.

Power actuators may have sufficient power to lift a closure member even if a lift-assist mechanism is disabled or broken. Under some circumstances the power actuator may not be able to hold the closure member in the raised position if the closure member is manually opened, if the lift-assist mechanism breaks, or becomes inoperative. The power actuator normally stops when the closure member is fully opened. The weight of the closure member may cause the closure member to close in an uncontrolled manner under the force of gravity after the motor stops.

This disclosure is directed to solving the above problems and other problems as summarized below.

SUMMARY

Power operated, vertically moved closure members are raised to open and lowered to close and include lift gates, tailgates, deck lids, hoods, or tonneau covers. Power actuator motors may have sufficient torque to raise the closure member even if one or more torsion bars, air spring cylinders, counterbalance struts, or other lift-assist mechanisms are impaired or inoperative. In this situation, it is preferable to prevent the power actuator from either opening the closure member or reversing the power actuator. Alternatively, the control system for the power actuator may allow the closure member to be operated manually with a safety system being enabled to prevent rapid closing of the closure member. A diagnostic code may also be stored to indicate that a system component requires service or replacement.

The lifting system may be prevented from opening when the current draw profile indicates that the power actuator system is prevented from opening to avoid the situation in which the closure member unexpectedly closes because the malfunctioning components cannot hold the closure member open. The current draw profile of the malfunctioning system is monitored as a function of the level of current drawn and the position of the closure member.

The control system for the power actuator may be provided with a signal relating to the level of current drawn by the power actuator motor. In response to the level of current drawn signal, the control system may be programmed to prevent operation of the power actuator. A broken torsion bar causes an increase in the force required to open the closure member. Alternatively, a problem with the power actuator may also cause an increase in the force required to open the closure member. In either event, the power actuator motor requires additional current to operate. Some power operated closure members may be designed to be raised and lowered manually even if the power actuator is prevented by the controller from operating. Safety systems are disclosed that prevent rapid closing of the closure member that is manually opened. In either case, a "fail safe" condition is provided that eliminates the risk to operators who may otherwise position themselves under a falling closure member.

Alternatively, the closure member may be permitted to open fully when a lift-assist component is broken or only partially functional and a brake or catch mechanism may be engaged to prevent rapid closure of the closure member. Lift-assist components may include a counterbalance strut, an air or gas strut, or a torsion bar. The power actuator motor may be provided with an encoder that detects the position and changes in the position of the closure member. If the encoder detects rapid closing of the closure member, a safety system, such as a catch, clutch, or brake mechanism may be actuated or engaged.

According to one aspect of this disclosure, a system is disclosed for controlling the operation of a vertically moved closure panel for a vehicle. The system includes a power actuator having a motor for opening and closing the closure panel. A lift-assist member cooperates with the power actuator and is operated by a controller that controls the operation of the power actuator. A controller circuit monitors current draw of the motor providing a signal used to prevent operation of the power actuator when the current required for opening the closure panel exceeds a predetermined level, or profile, to prevent operation of the power actuator.

According to another aspect of this disclosure, a method is disclosed for controlling the operation of a vertically moved closure panel for a vehicle. The method comprises actuating a motor of a power actuator that moves the closure panel while measuring a level of current drawn by the motor. The level of current is compared to a predetermined level or a current profile based upon the position of the closure member as indicated by the encoder. The power actuator may be disabled if the level exceeds the predetermined level or deviates from the current profile, thereby providing an unopened closure that has failed in a safe manner for the benefit of the closure operator.

The method may further comprise a lift-assist mechanism that counterbalances the weight of the closure panel, and wherein the level of current drawn by the motor increases when the function of the lift-assist mechanism is impaired. According to the method, the level of current drawn by the motor increases when the function of the power actuator is impaired. For instance, when a gear box is jammed, requiring high torque to turn.

The above aspects of this disclosure and other aspects will be described in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
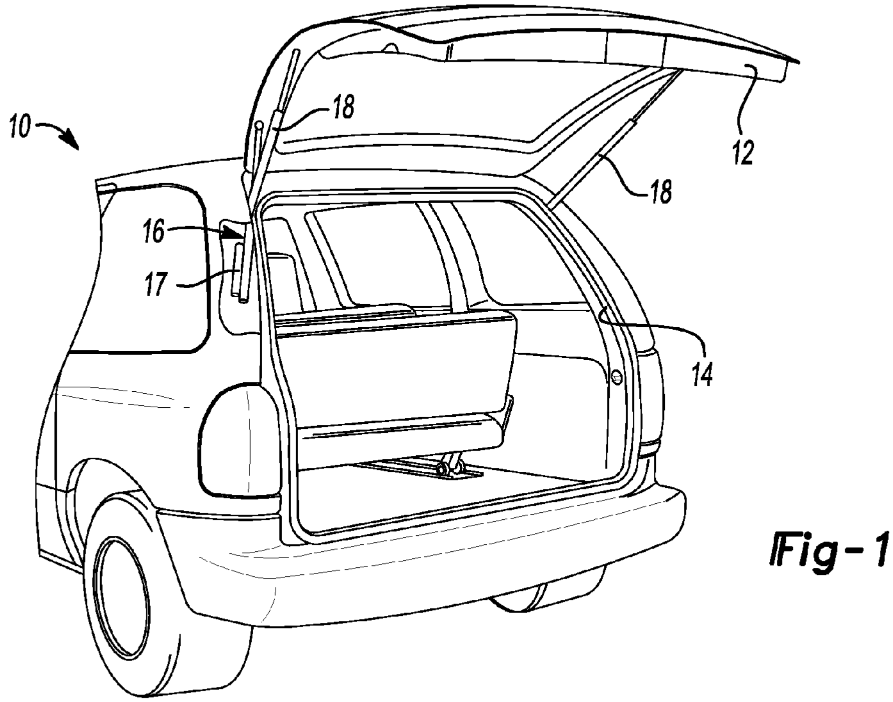
FIG. 1 is a fragmentary perspective view of the rear portion of a vehicle provided with a power lift gate having a gas or mechanical spring strut raised, or in the open, position.

Referring to FIG. 1, a vehicle 10 including a lift gate 12 that engages a door frame 14 in a closed position and is raised to an open position (as shown in FIG. 1) to provide access to the interior of the vehicle 10. Power actuator 16 includes a motor 17 that is actuated to move the lift gate 12, or closure member, between the open position and the closed position. The power actuator 16 is shown in FIG. 1 holding the lift gate 12 in the open position in conjunction with a gas cylinder 18. The gas cylinder 18 may be generally referred to as a "lift-assist mechanism." Other lift assist mechanisms may include a counterbalance strut, a tension spring, a combination gas/mechanical spring strut, or a torsion bar.

Figure 2:
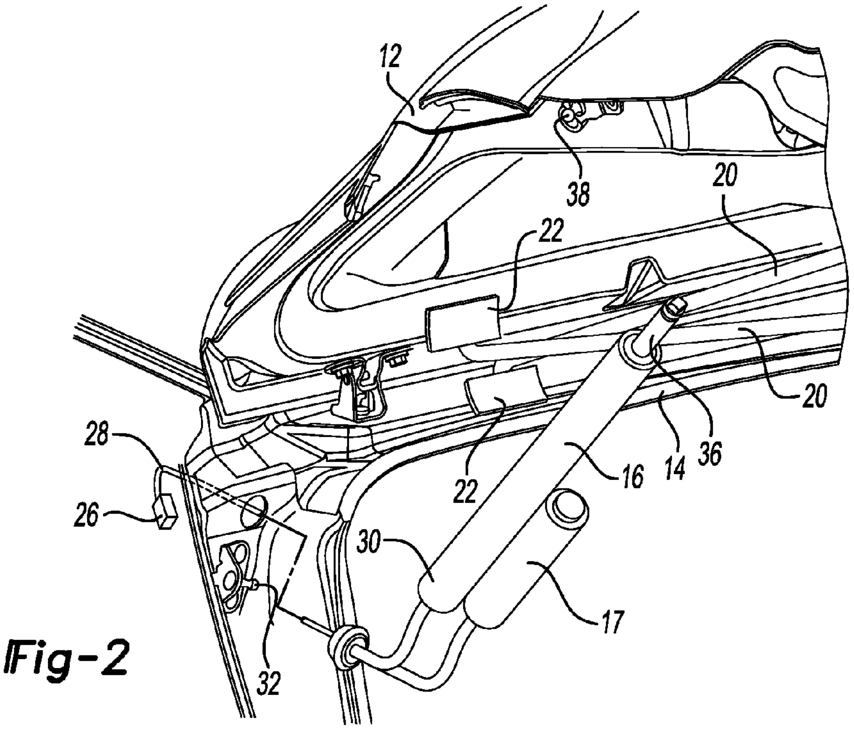
FIG. 2 is a fragmentary perspective view of the vehicle showing an alternative power actuator holding a lift gate having a set of torsion bars in a raised position.

Referring to FIG. 2, a torsion bar 20 is shown that is interconnected between the lift gate 12 and the door frame 14 to exert a lifting force that partially counterbalances the weight of the lift gate 12. The torsion bar is connected by torsion bar brackets 22 to the lift gate 12 and the door frame 14.

In FIG. 2, the power actuator 16 and motor 17 are shown separated from the door frame 14 and the lift gate 12 for better visibility. The power actuator 16 and torsion bars 20 are shown with the lift gate 12 open. The torsion bars 20 apply a lifting force to the lift gate 12 to facilitate raising the closure member into its open position in conjunction with the power strut actuator 16. A wiring connector 26 is connected by wires 28 to the power actuator 16. Control signals for the motor 17 and system monitoring encoder signals are provided through the wiring 28 to a controller, as will be described more fully below.

A pivot end 30 of the power actuator 16 is connected to a pin 32 or other type of pivot connector on the door frame 14. A rod end 36, or extensible end, of the power actuator 16 is connected by a pivot bracket 38, or pin, to the lift gate 12.

Figure 3:
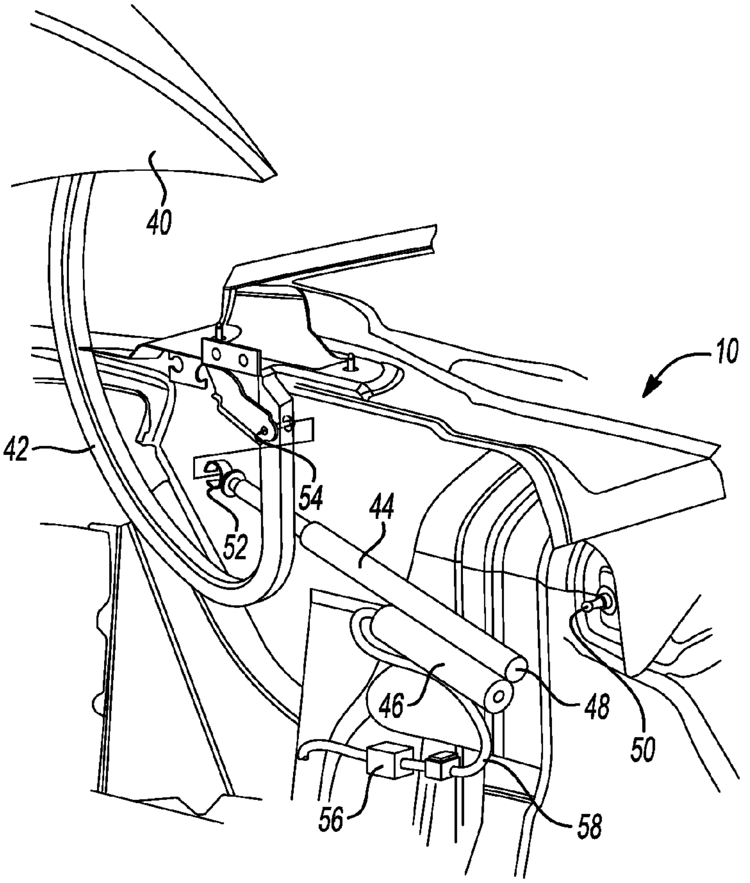
FIG. 3 is a fragmentary perspective view of a power operated deck lid with a power actuator attached between the vehicle and deck lid hinge having a gas or mechanical spring strut in the raised, or open, position.

Referring to FIG. 3, a deck lid 40 is shown in its open position on a vehicle 10. The deck lid 40 is moved by a gooseneck hinge 42 between its open and closed positions. A power strut 44 is operated by an actuator motor 46 that is external to the power strut 44 in FIG. 3. The power strut 44 is connected at a vehicle attachment end 48 to the vehicle 10 by a pivot pin 50, or pivot bracket. A deck lid end 52 of the power strut 44 is connected by a hinge connector pin 54 to the hinge 42 of the deck lid 40. A tension spring 59 is one example of a list assist mechanism that may be used in cooperation with the power actuator. Other lift assist mechanisms used to cooperate with the power actuator may include a counter balance strut, a combination gas/mechanical spring strut, or torsion bars. The actuator motor 46 is connected by an electrical connector 56 through wiring 58 to the controller, as will be described below.

Figure 4:
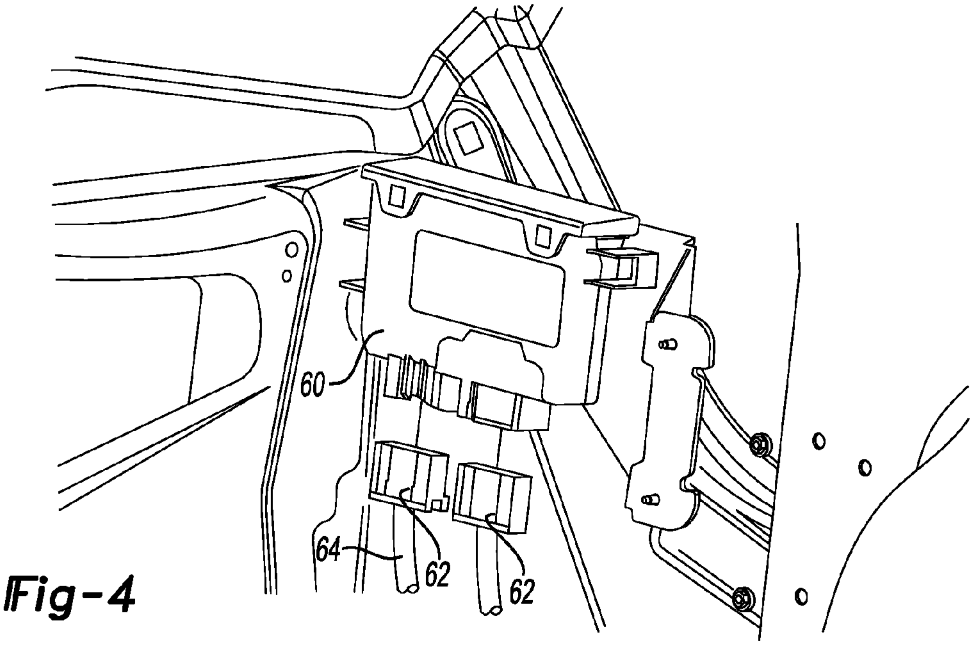
FIG. 4 is a fragmentary perspective view of a controller for a power actuator.
Figure 6:
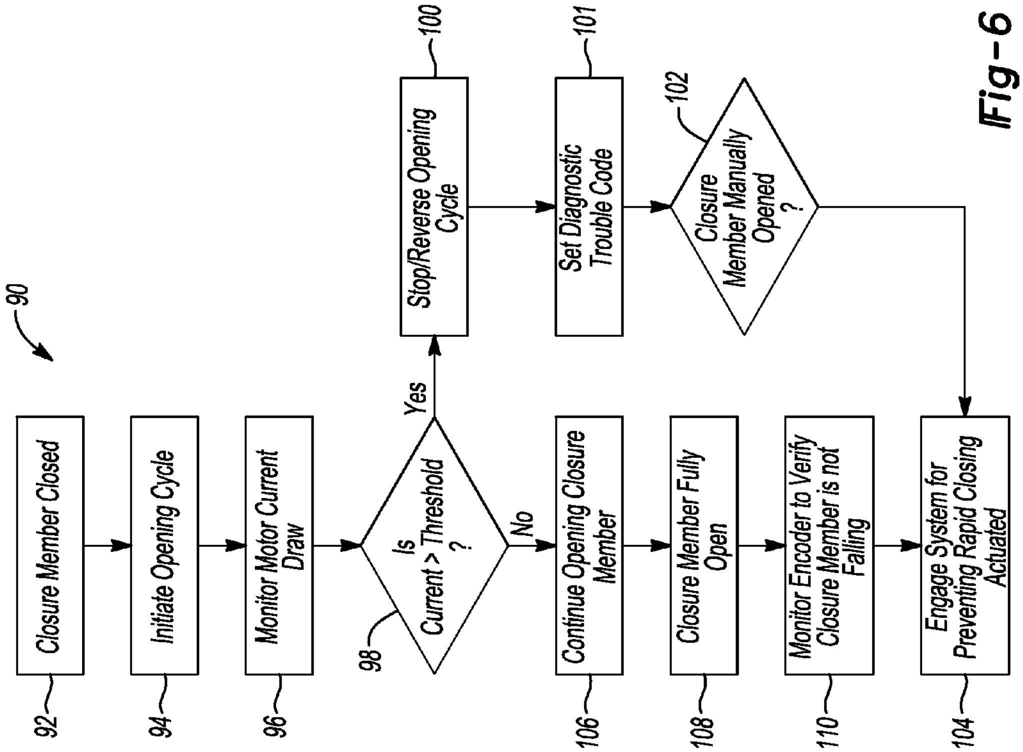
FIG. 6 is a flowchart illustrating an alternative embodiment of the system that permits manual operation of the closure member with a catch or brake that prevents rapid closing of the closure member.

Referring to FIG. 4, a controller 60 that may be used with any of the embodiments of FIGS. 1-3 is attached to the vehicle at an internal location. The controller 60 may only control the closure member or may be integrated as part of another vehicle control system. The controller 60 is attached by connectors 62 and wiring 64 to either motor 17 of the power actuator 16 (as shown in FIG. 2) or the motor 46 of the power strut 44 (as shown in FIG. 3). Operation of the controller 60 as it relates to controlling the power actuator 16 and motor 17, or the power strut 44 and actuator motor 46 is described below with reference to FIGS. 5 and 6.

Figure 5:
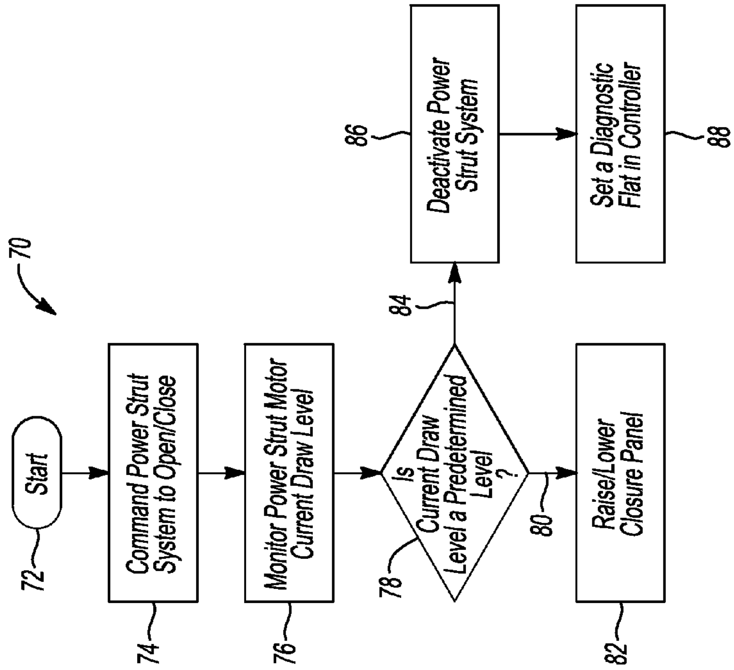
FIG. 5 is a flowchart illustrating the steps followed by the controller of the power actuator system illustrating one way of practicing the concept disclosed in this application.

Referring to FIG. 5, a control algorithm 70 is illustrated as a flowchart to the extent that it relates to operation of the motor 17 and power actuator 16 or actuator motor 46 and power strut 44. The controller 60 is also expected to provide other functions, such as obstruction detection, proximity sensors and other functions such as lighting control and may be otherwise integrated with the vehicle operating system.

With continued reference to FIGS. 1-4 and particular reference to FIG. 5, the control algorithm 70 illustrated by the flowchart starts at 72. A command to the power strut system to open or close the enclosure member is provided at 74. The command may be from an internal switch from the dashboard of the vehicle, a key fob, a proximity sensor, or other device that may be used to control a closure function. Upon receiving the command to open or close the closure member at 74, the controller monitors the power strut motor current draw levels at 76. The controller 60 may also receive data from an encoder, or angle sensor (not shown), that is integral with the motor 17, 46. The encoder is used to provide a reliable indication of the position of the closure member 12.

In one example, the power strut motor may normally draw an expected level of current of, for example, between 6 and 10 amps. The current draw level is compared at 78 to a predetermined level of current. The predetermined level is less than the level of current drawn by the motor than if the closure member contacts an obstruction that would prevent the closure member from opening. The predetermined level of current in one example is 14 amps, but may be set a different level depending upon the calibration of the system and components. The predetermined level of 14 amps is appropriate for a power strut motor that requires a current draw level of between 6 and 10 amps. The level of current drawn by the motor may be normalized to a battery source to maintain separation of a failure mode population from a nominal population of the level of the current drawn. Alternatively, the current draw level may be compared to the data from the encoder to permit correlation of the current draw level and the encoder data.

The current draw level increases if the torsion bar 20 is broken or if the counterbalance cylinder 18 is broken or damaged. The current draw level may also be increased if the power strut or motor 17, 46 malfunctions or is damaged. By monitoring the power strut motor current draw level at 76, it is possible to detect a malfunction of any part of the actuators 16, 44 or lift-assist mechanisms that causes the level of current drawn to increase, for example, to between 18 and 27 amps.

Depending upon the other components of the system, the extent that the current draw level increases may differ from the range in the above example. If the current draw level is not greater than the predetermined level, the controller provides a command on line 80 to the power strut motor to open or close the closure panel at 82.

If the current draw level is greater than the predetermined level at 78, the controller provides a signal on line 84 to either deactivate or reverse the power strut system at 86. By deactivating or reversing the power strut system at 86, the closure member 12 is prevented from being opened by the power strut system and may be limited to manual operation. In manual operation, it is important that the closure member is capable of being opened by the user so that access is still provided in a manual mode so that access is provided to the vehicle interior.

Once the power strut system is deactivated at 86, a signal is sent to the controller to set a diagnostic flag at 88. The diagnostic flag set at 88 remains effective to prevent activation of the power strut system until the system is serviced by a service technician who then can reset the diagnostic flag and enable operation of the power strut system. The number of times that the closure member may be opened after the diagnostic flag is set may be limited to a fixed number of openings, for example a manual opening may be limited to 10 times with the system locking the closure member on the eleventh attempt to be sure that the vehicle is properly serviced.

Referring to FIGS. 1-4 and 6, an alternative embodiment of a control algorithm 90 is illustrated by a flowchart. The control algorithm 90 is applicable to systems that permit manual operation of a closure member 12. The closure member is closed at 92 until the opening cycle is initiated at 94. The current draw of the motor is monitored at 96 and if the current drawn by the motor exceeds a threshold current level at 98, the opening cycle of the system is stopped or reversed at 100. If the system is stopped or reversed a diagnostic trouble code may be set at 101. The closure member may be manually opened at 102.

If the closure member is manually operated, a system for preventing rapid closing of the closure member is actuated or engaged at 104. The encoder associated with the motors 17, 46 (or other closure member position sensor) may be used to monitor the position of the closure member when open so that if the closure member begins to fall, the system for preventing rapid closure may be engaged. The system for preventing rapid closing of the closure member may be a catch mechanism, a clutch, or a brake that is internal to the motor 17, 46. Alternatively, the motor may be actuated to stop the motion of the lift gate or may function to close the lift gate under control by the motor 17, 46.

If the motor current draw is not greater than the threshold at 98, the opening cycle continues at 106 until the closure member is fully open at 108. The encoder may be monitored at 110 to detect a rapid closing event and engage the safety system at 104.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A control system for a closure panel comprising:
- a power actuator including a motor for opening and closing the closure panel;
- a lift-assist member cooperating with the power actuator;
- a circuit monitoring current draw of the motor and a position of the closure panel; and
- a controller correlates the position of the closure panel with the current draw to control operation of the power actuator based upon the current draw and closure panel position.

2. The control system of claim 1 wherein the lift-assist member is selected from the group consisting of:
- a torsion bar;
- a tension spring
- a gas spring;
- a counterbalance strut; and
- a combination gas/mechanical spring strut.

3. The control system of claim 1 wherein the closure panel is selected from the group consisting of:
- a lift gate;
- a deck lid; and
- a hood;
- a tonneau cover; and
- a tailgate.

4. A method of controlling a closure panel for a vehicle comprising:
- actuating a motor that moves the closure panel;
- comparing a level of current drawn by the motor to a level corresponding to current drawn by a properly functioning lift-assist mechanism;
- monitoring an encoder associated with the motor that provides closure panel position data; and
- correlating the level of current drawn to the closure panel position data to disable the motor.

5. The method of claim 4 wherein the lift-assist mechanism counterbalances a weight of the closure panel, and wherein the level of current drawn by the motor increases when a function of the lift-assist mechanism is impaired.

6. The method of claim 5 wherein the lift-assist mechanism is selected from the group consisting of:
- a torsion bar;
- a tension spring;
- a gas spring;
- a counterbalance strut; and
- a combination gas/mechanical spring strut.

* * * * *